(12) United States Patent
Wu

(10) Patent No.: US 8,794,087 B2
(45) Date of Patent: Aug. 5, 2014

(54) GEAR MOTOR HAVING SAFETY MECHANISM

(75) Inventor: Chou-Hsin Wu, New Taipei (TW)

(73) Assignee: Timotion Technology Co., Ltd., New Taipei (TW)

( * ) Notice: Subject to any disclaimer, the term of this patent is extended or adjusted under 35 U.S.C. 154(b) by 228 days.

(21) Appl. No.: 13/492,438

(22) Filed: Jun. 8, 2012

(65) Prior Publication Data

US 2013/0327168 A1    Dec. 12, 2013

(51) Int. Cl.
*F16H 27/02* (2006.01)
(52) U.S. Cl.
USPC .................... 74/89.37; 74/424.71
(58) Field of Classification Search
USPC ............... 74/89.23, 89.37, 89.38, 89.39, 425, 74/424.5, 424.71
See application file for complete search history.

(56) References Cited

U.S. PATENT DOCUMENTS

| | | | | |
|---|---|---|---|---|
| 5,180,038 | A * | 1/1993 | Arnold et al. | 188/171 |
| 5,472,065 | A * | 12/1995 | Vergin | 185/40 R |
| 5,491,633 | A * | 2/1996 | Henry et al. | 701/36 |
| 5,789,835 | A * | 8/1998 | Obara | 310/80 |
| 5,809,833 | A * | 9/1998 | Newport et al. | 74/89.37 |
| 5,868,032 | A * | 2/1999 | Laskey | 74/89.37 |
| 5,878,624 | A * | 3/1999 | Showalter et al. | 74/473.37 |
| 5,901,610 | A * | 5/1999 | Schneider | 74/421 A |
| 5,913,763 | A * | 6/1999 | Beran et al. | 49/506 |
| 6,186,471 | B1 * | 2/2001 | Genga et al. | 251/129.12 |
| 6,321,611 | B1 * | 11/2001 | Szu et al. | 74/89.37 |
| 7,533,591 | B2 * | 5/2009 | Wang | 74/89.39 |
| 8,042,417 | B2 * | 10/2011 | Davies et al. | 74/89.39 |
| 8,272,285 | B2 * | 9/2012 | Kearns et al. | 74/89.37 |
| 8,358,096 | B2 * | 1/2013 | Bastholm | 318/626 |
| 8,459,133 | B2 * | 6/2013 | Inoue et al. | 74/89.37 |
| 8,534,147 | B2 * | 9/2013 | Roither et al. | 74/89.4 |
| 8,616,080 | B2 * | 12/2013 | Flatt et al. | 74/425 |
| 2002/0134180 | A1 * | 9/2002 | Gorin et al. | 74/89.37 |
| 2007/0169578 | A1 * | 7/2007 | Christensen et al. | 74/89.37 |
| 2008/0130310 | A1 * | 6/2008 | Pfister | 362/528 |
| 2009/0293655 | A1 * | 12/2009 | Tseng et al. | 74/89.37 |
| 2009/0301239 | A1 * | 12/2009 | Heinrichs | 74/89.37 |
| 2010/0139429 | A1 * | 6/2010 | Ku | 74/89.37 |
| 2010/0282009 | A1 * | 11/2010 | Knudsen et al. | 74/89.37 |
| 2010/0319472 | A1 * | 12/2010 | Wei et al. | 74/89.37 |
| 2011/0107859 | A1 * | 5/2011 | Osterlanger et al. | 74/89.37 |
| 2011/0290050 | A1 * | 12/2011 | Kummer et al. | 74/89.37 |
| 2012/0085186 | A1 * | 4/2012 | Osterlanger et al. | 74/89.37 |
| 2012/0222510 | A1 * | 9/2012 | Winther et al. | 74/89.23 |
| 2012/0255380 | A1 * | 10/2012 | Wu | 74/89.37 |
| 2012/0318082 | A1 * | 12/2012 | Wasser | 74/89.37 |
| 2013/0000432 | A1 * | 1/2013 | Akkermann | 74/89.37 |
| 2013/0008270 | A1 * | 1/2013 | Giovannone et al. | 74/89.37 |
| 2013/0327168 | A1 * | 12/2013 | Wu | 74/89.37 |

* cited by examiner

*Primary Examiner* — David M Fenstermacher
(74) *Attorney, Agent, or Firm* — Chun-Ming Shih; HDLS IPR Services

(57) ABSTRACT

A gear motor having a safety mechanism includes a motor body, a speed reduction mechanism, a transmission mechanism, and a touch switch. The speed reduction mechanism includes a worm and a worm wheel drivingly engaged with the worm. The transmission mechanism includes a base fixed to the speed reduction mechanism, a lead screw rod pivotally connected to the base and rotatably driven by the worm wheel, and a nut threadedly connected to the lead screw rod. The touch switch is electrically connected to the motor body and provided aside the lead screw rod, thereby stopping the motor body when the nut contacts the touch switch. Thus, the gear motor not only controls the operation of the driven mechanism, but also allows various driven mechanisms to be mounted thereon. The assembled volume of the gear motor and the driven mechanism is reduced.

11 Claims, 13 Drawing Sheets

GEAR MOTOR HAVING SAFETY MECHANISM

BACKGROUND OF THE INVENTION

1. Field of the Invention

The present invention relates to an actuator, and in particular to a gear motor having a safety mechanism.

2. Description of Prior Art

A transmission mechanism is widely used in various apparatuses such as electric sickbeds, treadmills, electric tables or the like for adjusting their height or inclination angle. The starting point and the terminal point of the stroke of the transmission mechanism are often provided with a touch switch respectively. When the transmission mechanism moves along its stroke and contacts the touch switch provided at the starting point or the terminal point, the touch switch will shut off the electricity supplied to the transmission mechanism, so that the transmission mechanism can stop operating at the terminal point or the starting point. In this way, the transmission mechanism can be prevented from idling or wearing at the starting point or the terminal point, thereby increasing the safety in use of such an apparatus having the transmission mechanism.

As shown in FIG. 1, the conventional linear actuator includes a gear motor 10 and a driven mechanism 20 connected to the gear motor 10. The driven mechanism 20 comprises a coupling rod 201, an output rod 202, and an annular block 203. The coupling rod 201 is threadedly connected to the output rod 202. The annular block 203 is fixed to the output rod 202. The gear motor 10 drives the coupling lever 201 to rotate, thereby driving the output rod 202 and the annular block 203 to move accordingly. Further, a first touch switch 30 and a second touch switch 40 are arranged to correspond to the output rod 202, so that the linear actuator 10 can be stopped operating when the annular block 203 contacts the first touch switch 30 or the second touch switch 40.

However, in practice, the above linear actuator still has following problems. The standard of the driving mechanism 20 of the linear actuator is different, so that the final position of the first touch switch 30 or the second touch switch 40 has to be varied. Thus, the manufacturers in this field have to prepare various combinations of the driven mechanisms 30 and touch switches, which increases the stocks and the difficulty in managing inventory. When the travelling distance of the output rod 202 is larger, the volume of the driven mechanism 20 will be increased because the first touch switch 30 and the second touch switch 40 have to be positioned to correspond to the output rod 202, and thus the whole linear actuator becomes bulky.

In order to solve the above problems of prior art, the present Inventor proposes a novel and reasonable structure based on his expert knowledge and deliberate researches.

SUMMARY OF THE INVENTION

The present invention is to provide a gear motor having a safety mechanism, in which a touch switch is provided on the gear motor, so that the gear motor can control the operation of the driven mechanism and also allow other kinds of driven mechanisms to be mounted thereon. By this arrangement, the assembled volume of the gear motor and the driven mechanism is reduced.

The present invention provides a gear motor having a safety mechanism, including: a motor body; a speed reduction mechanism comprising a worm extending from the motor body and a worm wheel positioned to correspond to the worm and drivingly engaged therewith; a transmission mechanism comprising a base fixed to the speed reduction mechanism, a lead screw rod pivotally connected to the base and rotatably driven by the worm wheel, and a nut threadedly connected to the lead screw rod to generate a linear movement; and a touch switch electrically connected to the motor body, the touch switch being provided on one side of the lead screw rod to correspond to a travelling path of the nut, thereby stopping the running of the motor body when the nut contacts the touch switch.

The present invention has advantageous features as follows:

The clockwise or counterclockwise rotation of the lead screw rod will causes the nut to move linearly, so that the motor body stops running when the nut contacts the touch switch. In this way, the contact position between the touch switch and the nut can be used to control the maximum number of rotations of the lead screw rod. In this way, the number of rotations of the lead screw rod can be prevented from exceeding a predetermined value of a user, thereby increasing the safety in use of the gear motor.

The rotation of an adjustable screw rod can be used to adjust the position of the contact switch relative to the nut, and further adjust the maximum number of rotations of the lead screw rod. On the other hand, the nut and a portion of the touch switch are exposed to the outside of the base, so that they can be inspected and adjusted easily by the user and even a fine adjustment is possible.

The gear motor of the present invention is additionally mounted with a driven mechanism, so that the driving mechanism can be prevented from operating continuously at the terminal point and the starting point. Thus, the present invention can prevent the driven mechanism from idling or wearing, thereby increasing the safety in use. Further, the gear motor allows various kinds of driven mechanisms to be mounted thereon, so that the manufacturers in this field can reduce their stocks including the driven mechanism, the touch switch and the combinations thereof. Thus, the cost for assembling the gear motor and the driven mechanism can be reduced.

According the present invention, the position of the touch switch is arranged to correspond to that of the nut, that is to correspond to the length of the lead screw rod. Thus, even though the number of rotations of the lead screw rod is increased, it is not necessary to increase the length of the lead screw rod, but to reduce the pitch of outer threads of the lead screw rod. Thus, the present invention can reduce the assembled volume of the gear motor and the driven mechanism sufficiently.

DETAILED DESCRIPTION OF THE INVENTION

Figure 1:
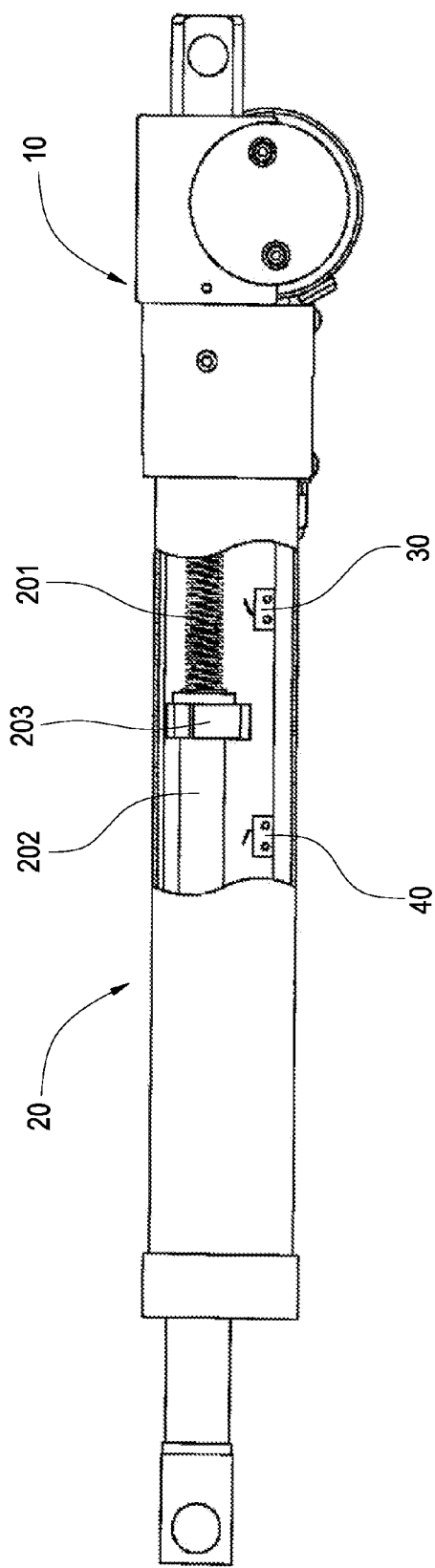
FIG. 1 is a schematic view showing the operating state of a conventional linear actuator.
Figure 2:
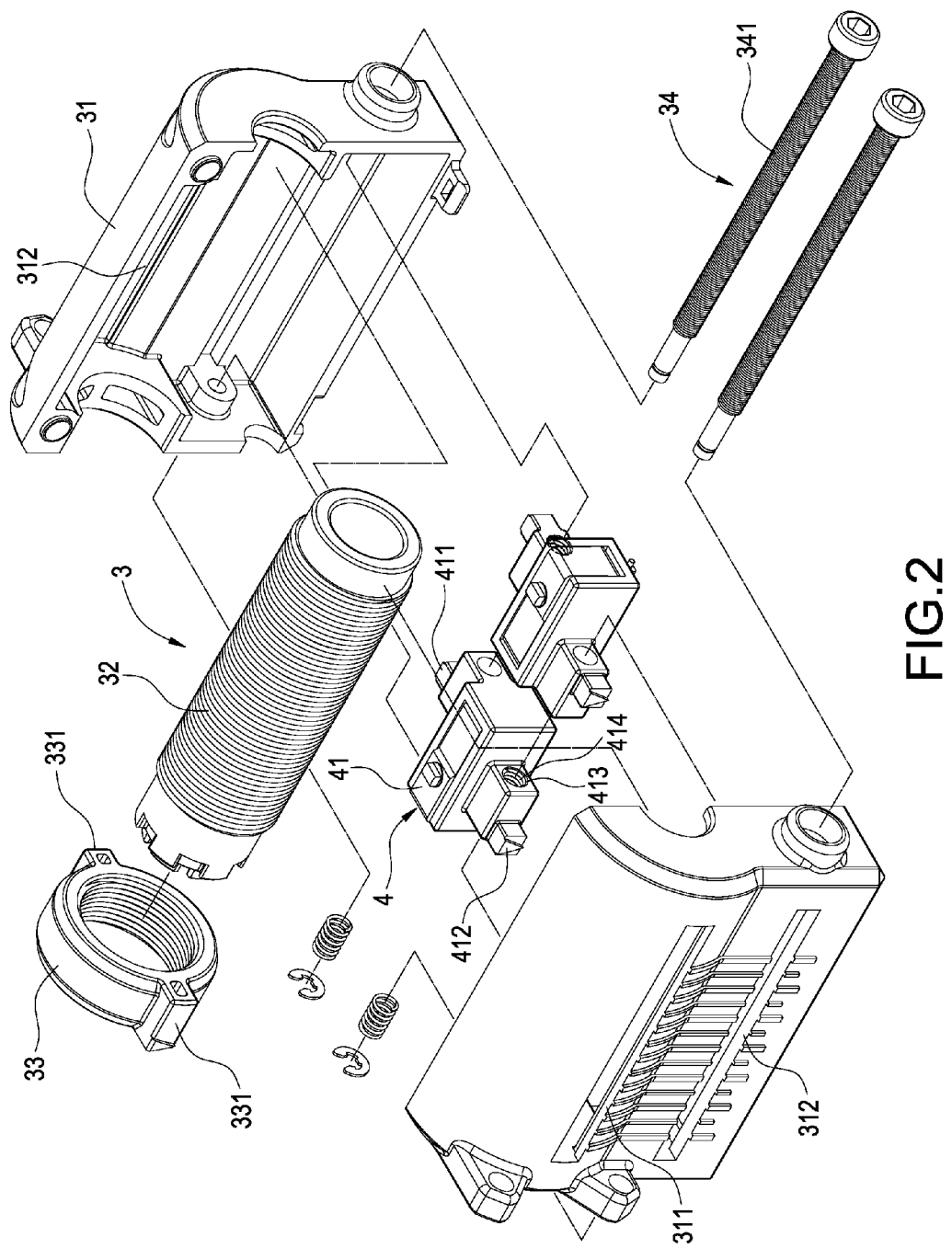
FIG. 2 is an exploded perspective view showing the transmission mechanism and the touch switch of the present invention.
Figure 3:
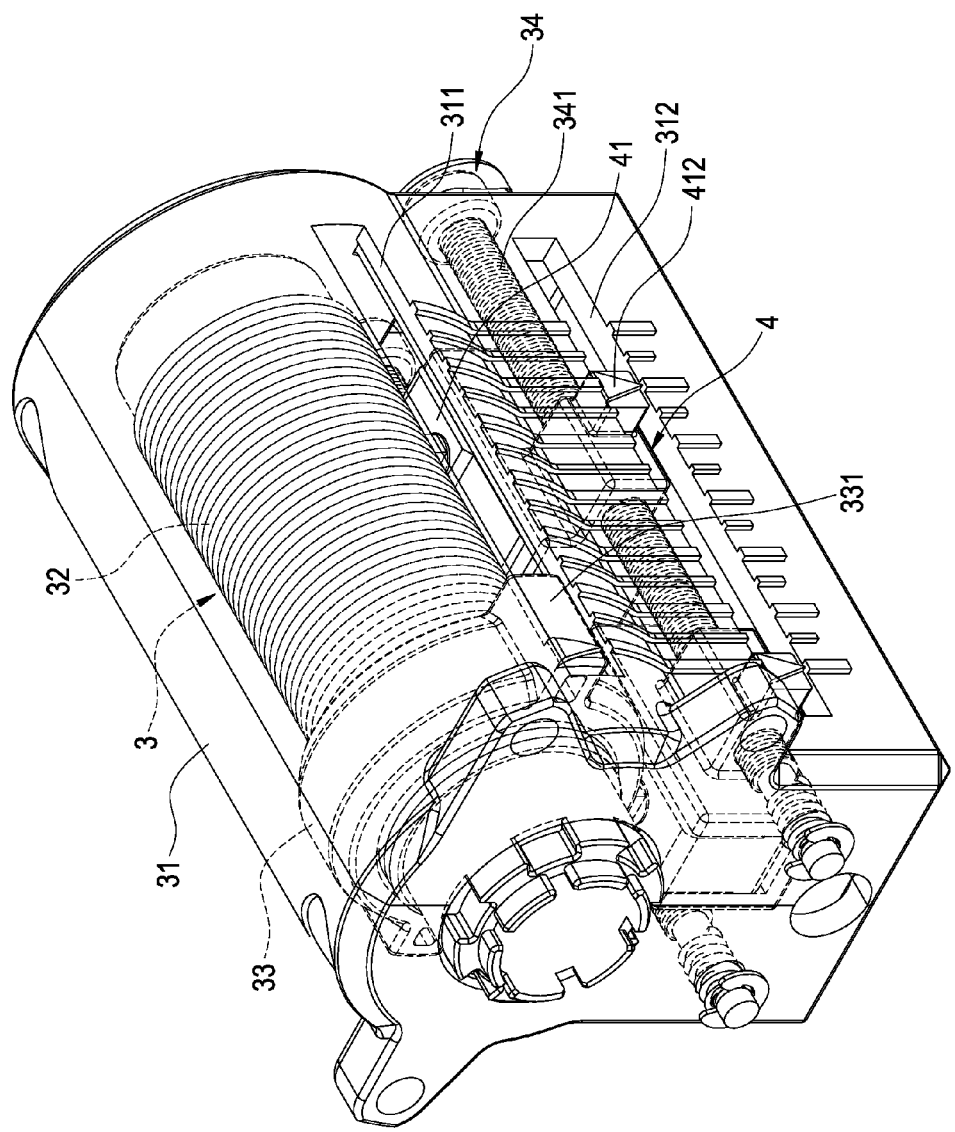
FIG. 3 is an assembled perspective view showing the transmission mechanism and the touch switch of the present invention.
Figure 4:
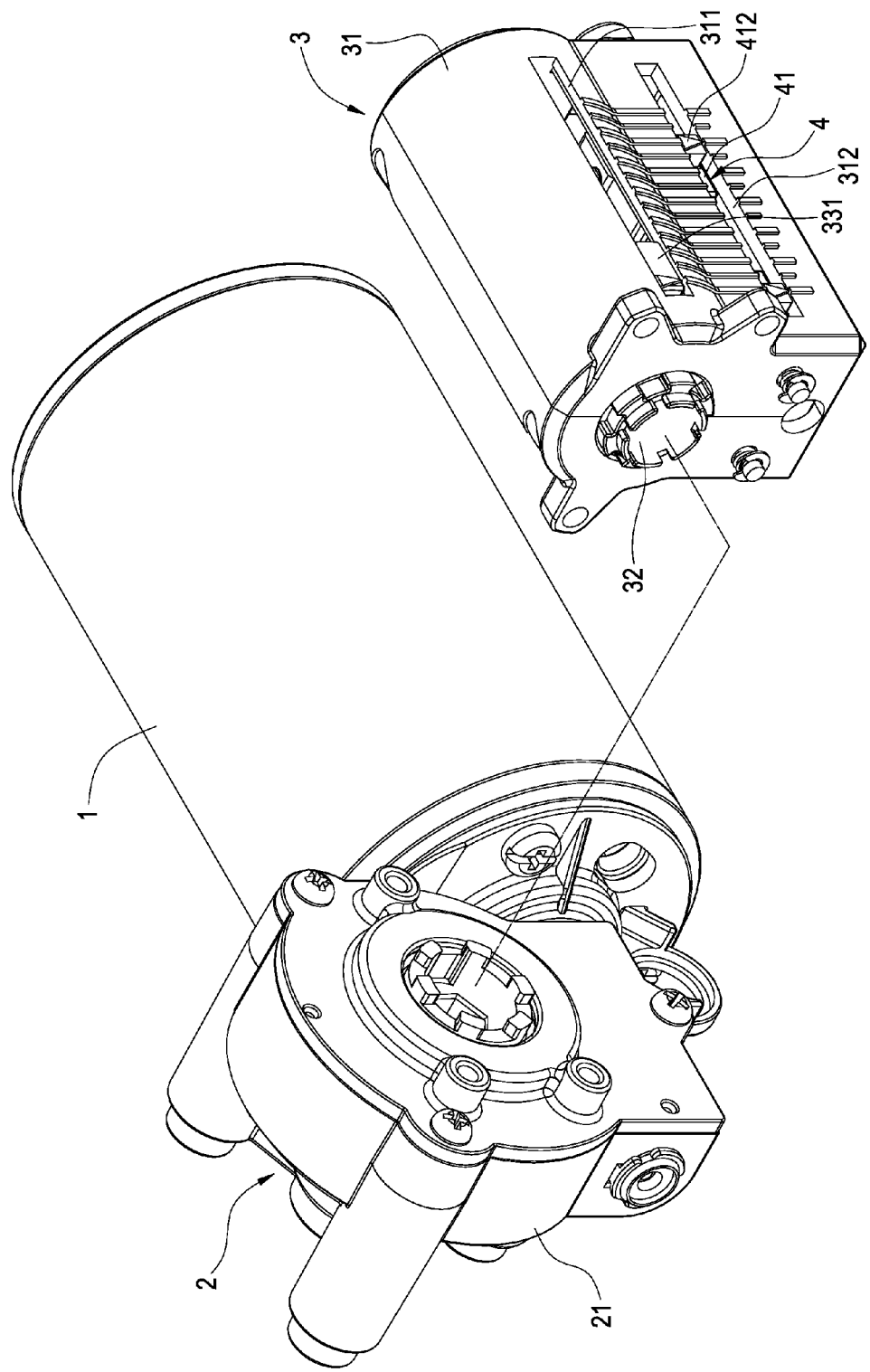
FIG. 4 is an exploded perspective view showing the gear motor of the present invention.
Figure 5:
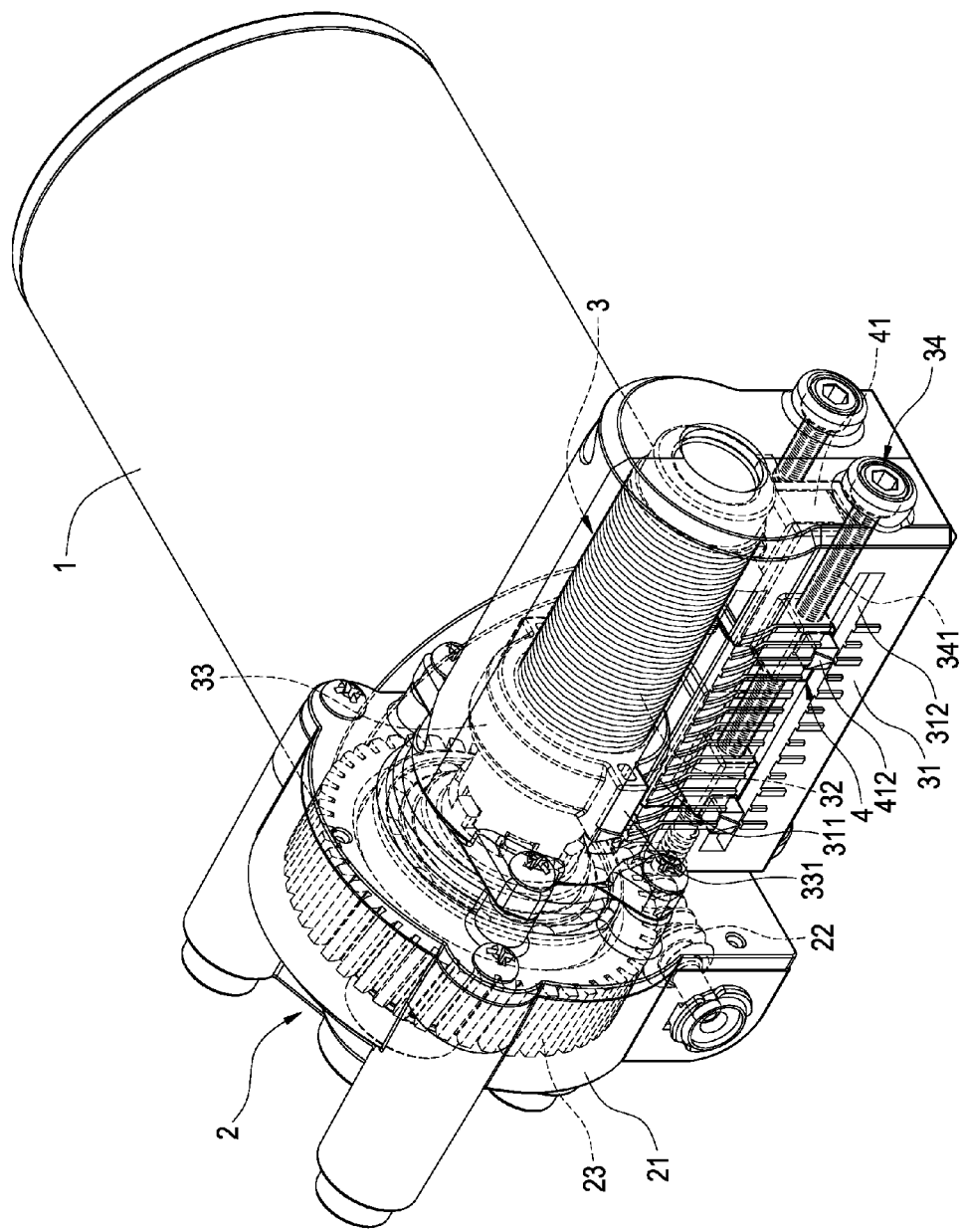
FIG. 5 is an assembled perspective view showing the gear motor of the present invention.
Figure 6:
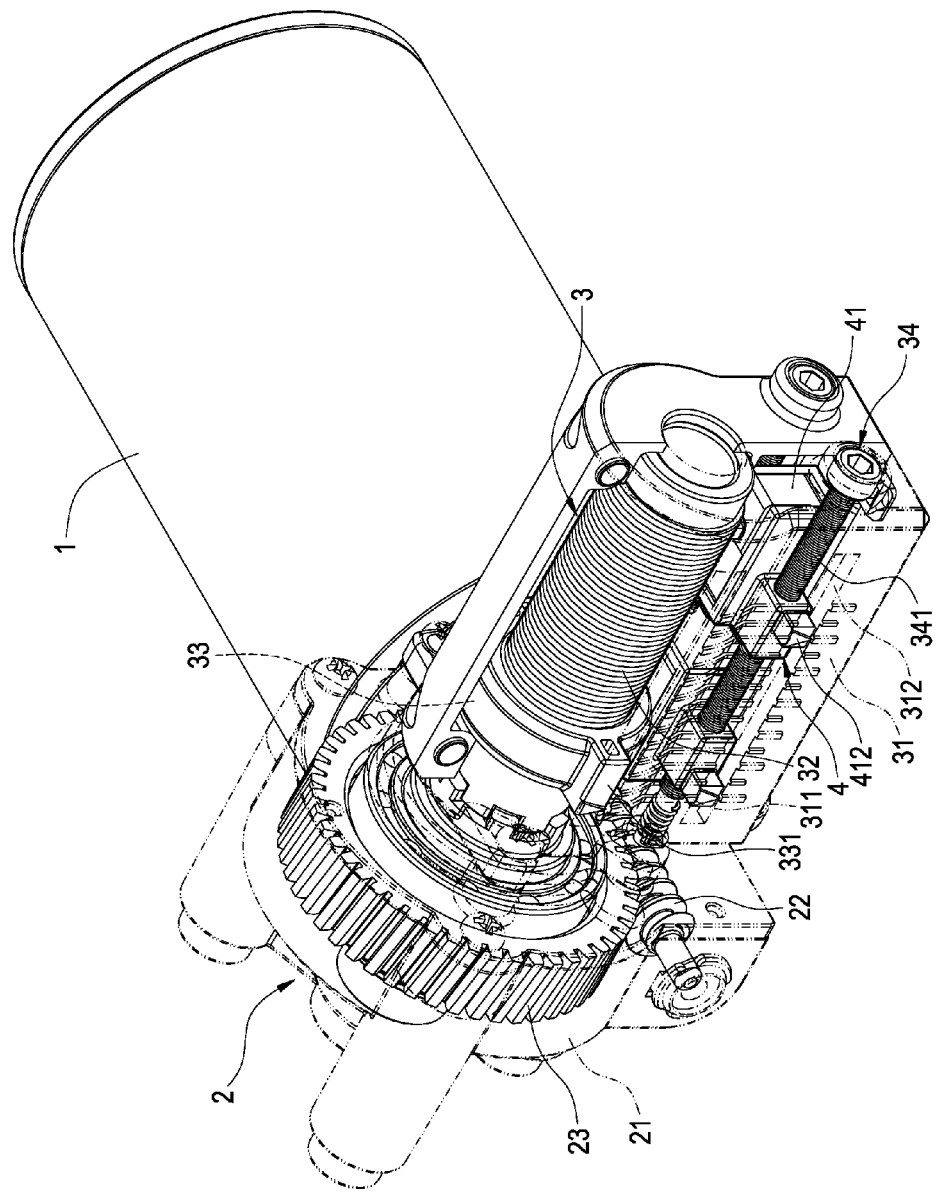
FIG. 6 is a schematic view showing the operating state of the gear motor of the present invention.

The detailed description and technical contents of the present invention will become apparent with the following detailed description accompanied with related drawings. It is noteworthy to point out that the drawings is provided for the illustration purpose only, but not intended for limiting the scope of the present invention.

Please refer to FIGS. 2 to 5. The present invention provides a gear motor having a safety mechanism, which includes a motor body 1, a speed reduction mechanism 2, a transmission mechanism 3 and a touch switch 4.

The speed reduction mechanism 2 comprises a casing 21, a worm 22, and a worm wheel 23. The casing 21 covers the worm 22 and the worm wheel 23. The worm 22 extends from the motor body 1. The worm wheel 23 is positioned to correspond to the worm 22 and drivingly engaged therewith.

The transmission mechanism 3 comprises a base 31 fixed to the speed reduction mechanism 2, a lead screw rod 32 pivotally connected to the base 31 and rotatably driven by the worm wheel 23, and a nut 33 threadedly connected to the lead screw rod 32 to generate a linear movement. The base 31 is fixedly connected to the casing 21. The lead screw rod 32 is arranged to be perpendicular to the worm 22. The base 31 is provided with a guiding groove 311 in parallel to the lead screw rod 32. The nut 33 has a rotation-stopping portion 331 slidably inserted into the guiding groove 311. The rotation-stopping portion 331 is exposed to the outside of the base 31 through the guiding groove 311.

The transmission mechanism 3 further comprises a fixing element 34 fixed to the base 31. The touch switch 4 is mounted to the fixing element 34. The fixing element 34 has an adjustable screw rod 341 in parallel to the lead screw rod 32. The base 31 is further provided with an engaging trough 312 in parallel to the adjustable screw rod 341.

The touch switch 4 is electrically connected to the motor body 1. The touch switch 4 is provided on one side of the lead screw rod 32 to correspond to the travelling path of the nut 33 for stopping the running of the motor body 1 when the nut 33 contacts the touch switch 4. More specifically, the touch switch 4 has a seat portion 41 provided with a switch key 411 and an engaging block 412. The seat portion 41 is provided with a through-hole 413 and an inner thread hole 414 formed in the through-hole 413. The seat portion 41 is threadedly connected to the adjustable lead screw 341 via inner threads 414. The engaging block 412 is slidably inserted into the engaging trough 312. The engaging block 412 is exposed to the outside of the base 31 through the engaging trough 312. The number of the touch switch 4 and the adjustable screw rod 341 may be plural. In the present embodiment, there are two touch switches 4 and two adjustable screw rods 341. Each of the touch switches 4 is threaddedly connected to a corresponding adjustable screw rod 341. A gap is formed between the two touch switches 4.

In the gear motor having a safety mechanism according to the present invention, the speed reduction mechanism 2 comprises a worm 22 extending from the motor body 1 and a worm wheel 23 positioned to correspond to the worm 22 and drivingly engaged therewith. The transmission mechanism 3 comprises a base 31 fixed to the speed reduction mechanism 2, a lead screw rod 32 pivotally connected to the base 31 and rotatably driven by the worm wheel 23, and a nut 33 threadedly connected to the lead screw rod 32 to generate a linear movement. The touch switch 4 is electrically connected to the motor body 1. The touch switch 4 is arranged on one side of the lead screw rod 32 to correspond to the travelling path of the nut 33, thereby stopping the running of the motor body 1 when the nut 33 contacts the touch switch 4. By this arrangement, the clockwise or counterclockwise rotation of the lead screw rod 32 will cause the nut 33 to move linearly. Since the motor body 1 stops running once upon the nut 33 contacts the touch switch 4, the contact position between the touch switch 4 and the nut 33 can be used to control the maximum number of rotations of the lead screw rod 32, thereby preventing the number of rotations of the lead screw rod 32 from exceeding a predetermined value. Thus, the safety in use of the gear motor of the present invention can be increased greatly.

Figure 7:
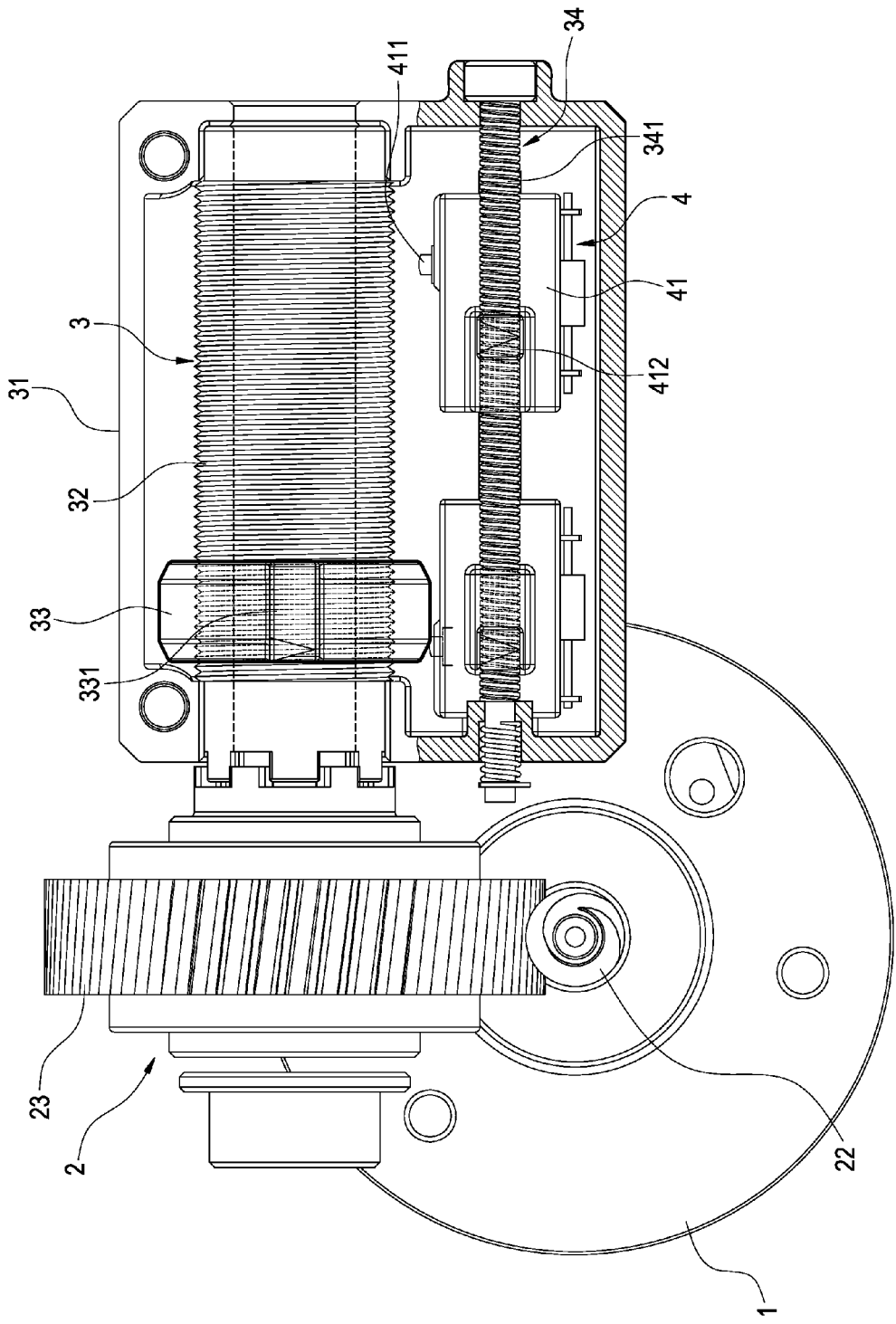
FIG. 7 is a cross-sectional view showing the gear motor of the present invention.
Figure 8:
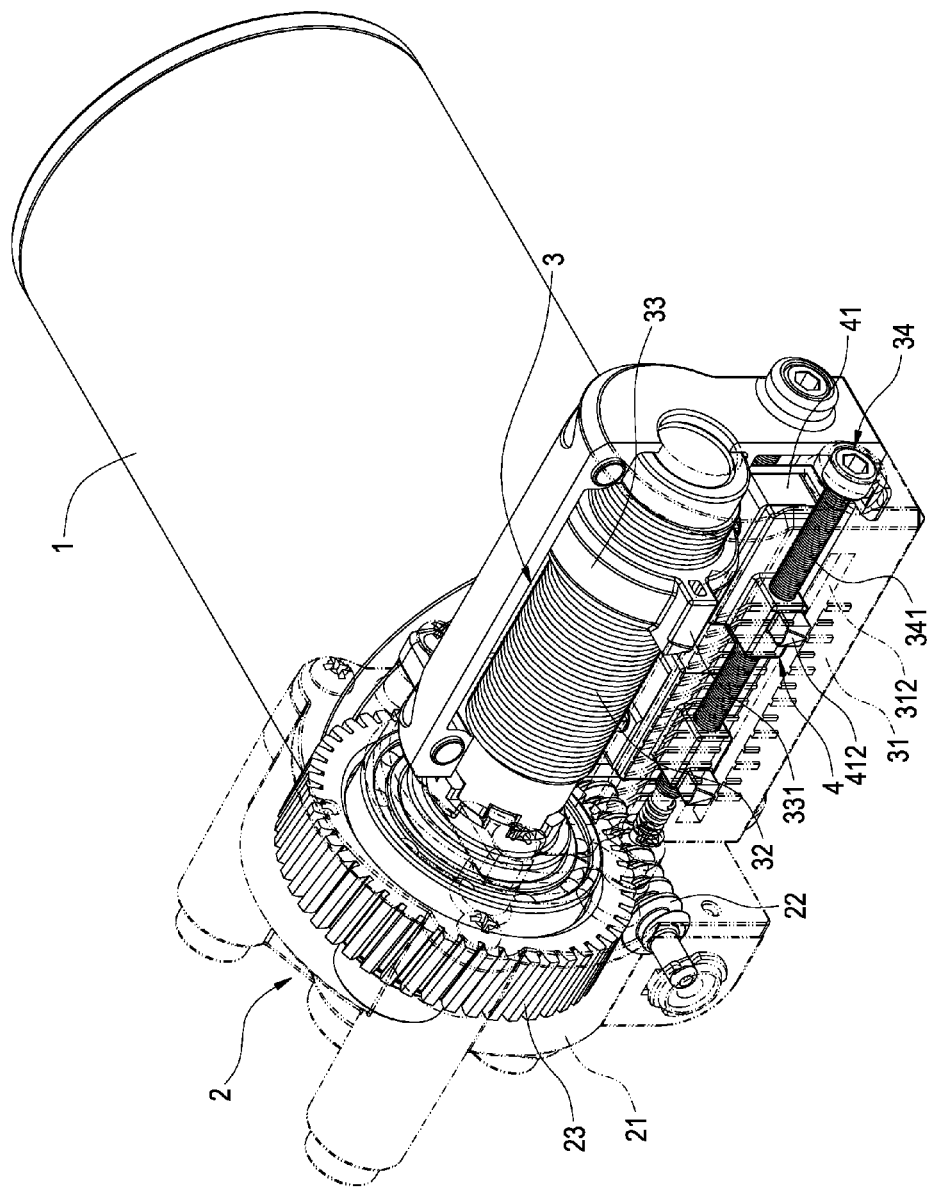
FIG. 8 is a schematic view showing another operating state of the gear motor of the present invention.
Figure 9:
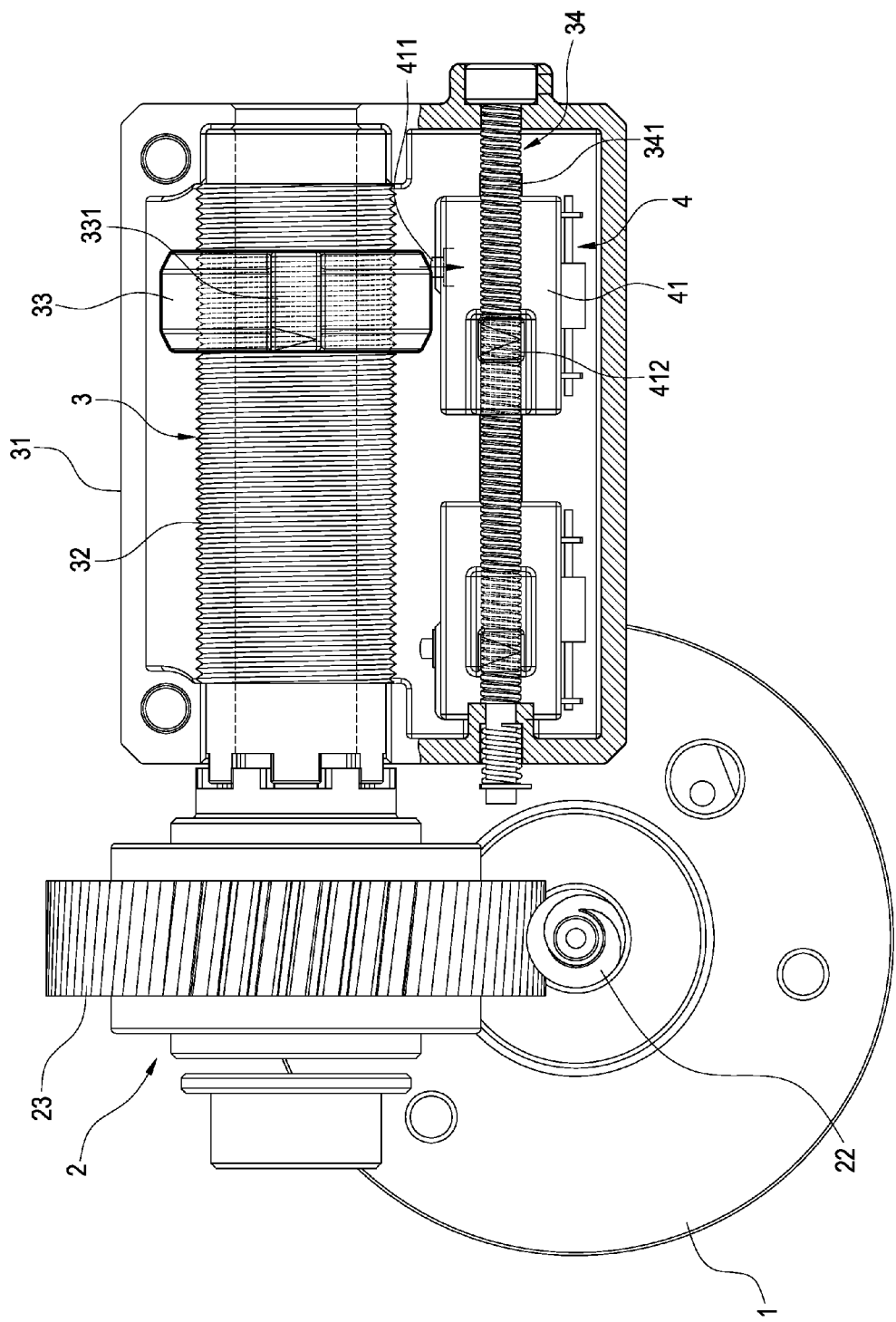
FIG. 9 is another cross-sectional view showing the gear motor of the present invention.
Figure 10:
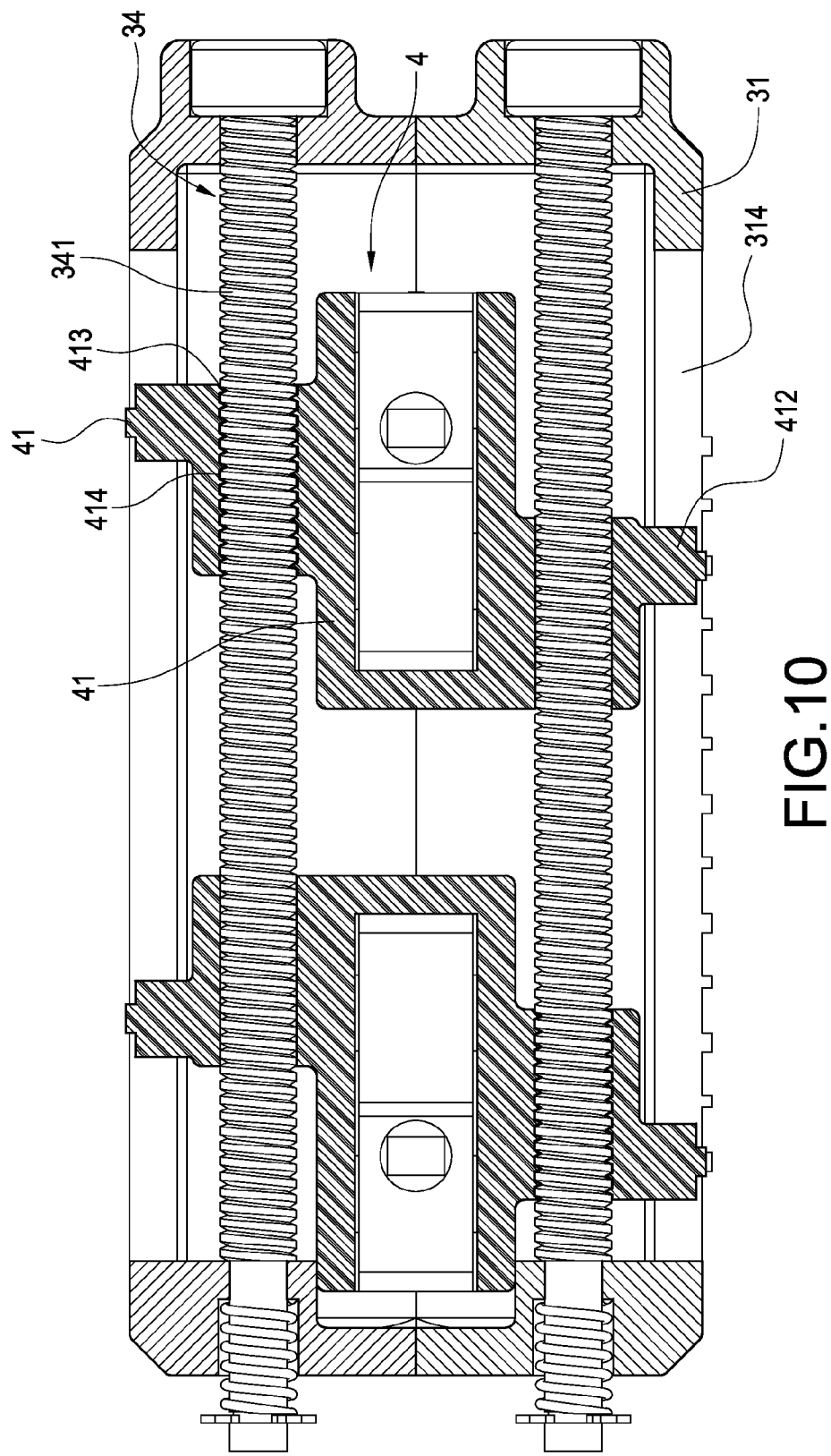
FIG. 10 is a schematic view showing an operating state of the touch switch of the present invention.

Please refer to FIGS. 6 to 10 showing the operating states of the present invention respectively. The nut 33 is drawn by the lead screw rod 32 and restrained by the guiding groove 311, so that the nut 33 can move linearly. More specifically, the outer threads of the lead screw rod 32 are engaged with the inner threads of the nut 33, and the movement of the nut 33 is restrained by the guiding groove 311, so that the nut 33 can only move linearly. As a result, when the lead screw rod 32 rotates a complete circle, the nut 33 displaces a thread pitch. Thus, if the lead screw rod 32 rotates more circles, the nut 33 displaces a larger distance. Further, the motor body 1 stops running once upon the nut 33 contacts the switch key 411 of the touch switch 4. Thus, the contact position between the touch switch 4 and the nut 33 can be used to control the maximum number of rotations of the lead screw rod 32 as shown in FIGS. 7 and 9, thereby preventing the number of clockwise or counter clockwise rotations from exceeding a predetermined value.

The stopping portion 331 of the nut 33 is exposed to the outside of the base 31 through the guiding groove 311. The touch switch 4 is mounted to the adjustable screw rod 341, and the engaging block 412 of the touch switch 4 is slidably inserted into the engaging trough 312 to be exposed to the outside of the base 31 via the engaging trough 312. By this arrangement, the rotation of the adjustable screw rod 341 can be used to adjust the position of the touch switch 4 relative to the nut 33, and further adjust the maximum number of rotations of the lead screw rod 32. On the other hand, since the rotation-stopping portion 331 of the nut 33 and the engaging block 412 of the touch switch 4 are both exposed to the outside of the base 31, they can be inspected and adjusted by the user easily and even a fine adjustment is possible.

Figure 11:
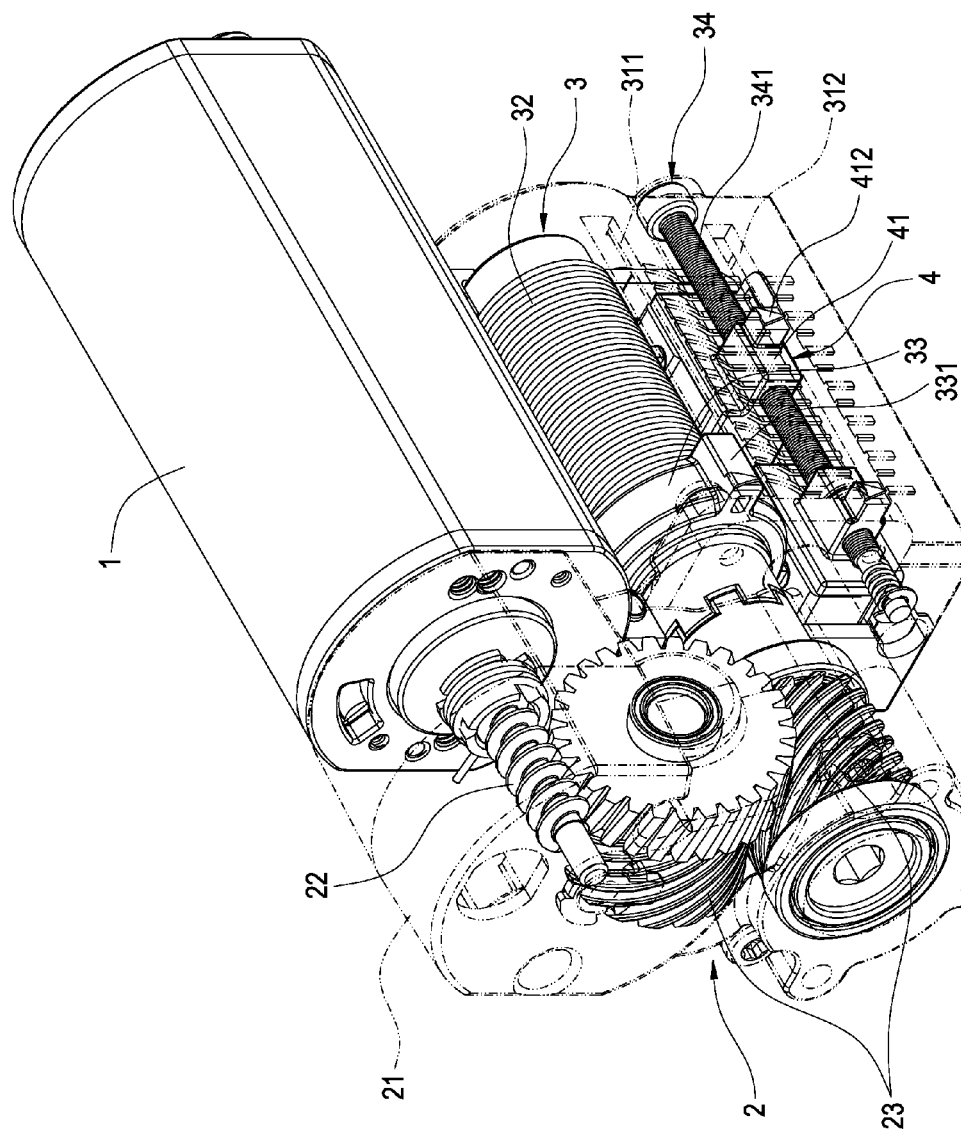
FIG. 11 is a schematic view showing an operating state of the gear motor according to another embodiment of the present invention.
Figure 12:
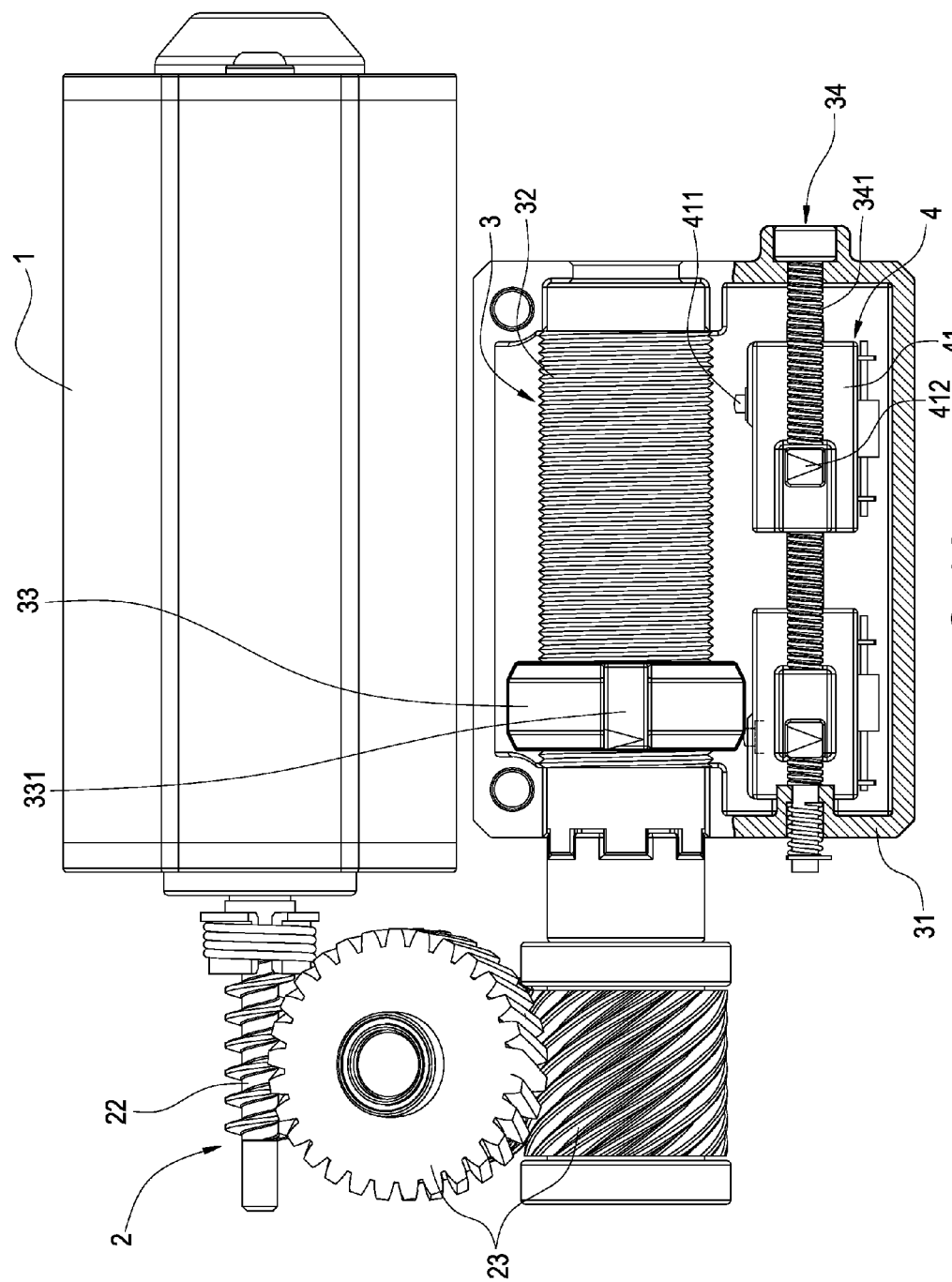
FIG. 12 is a cross-sectional view showing the gear motor according to another embodiment of the present invention.

Please refer to FIGS. 11 to 12, which show another embodiment of the gear motor of the present invention. In the present embodiment, the number of the worm wheels 23 is two. The two worm wheels 23 are drivingly engaged with each other, thereby changing the transmission direction of the motor body 1 and making the lead screw rod 32 to be parallel to the worm 22. By this arrangement, no matter how a force-outputting end (worm 22) or a force-applied end (lead screw rod 32) of the gear motor of the present invention changes its transmission direction, the above functions and effects can be achieved.

Figure 13:
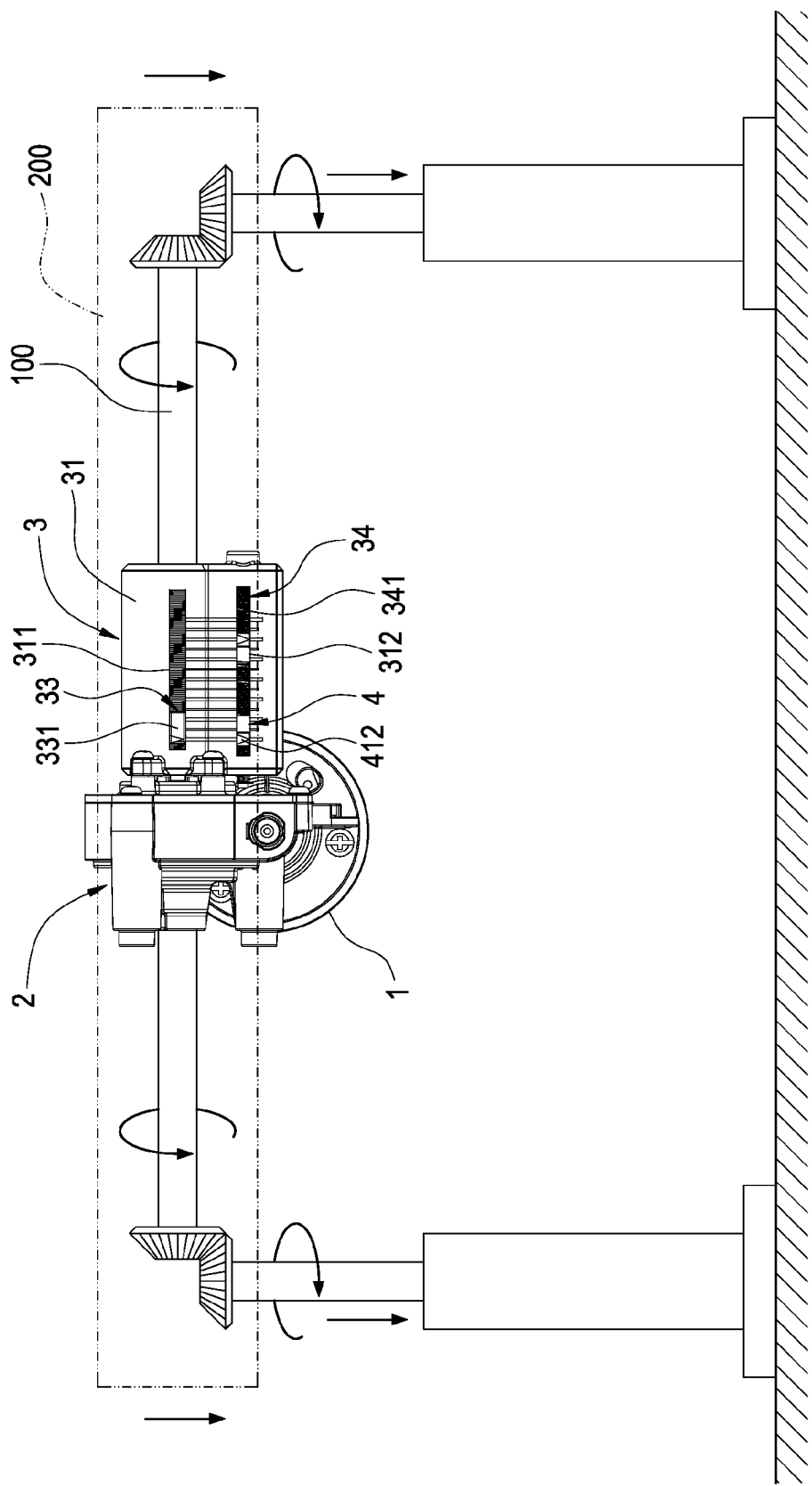
FIG. 13 is a schematic view showing a further operating state of the gear motor of the present invention.

Please refer to FIG. 13 showing another operating state of the gear motor of the present invention. In the gear motor of the present invention, the lead screw rod 32 is connected to the driven mechanism 100 to thereby drive the driven mechanism 100 for operation. Then, the gear motor and the driven mechanism 100 are embedded into an electric table 200 to thereby adjust the rising and lowering of the electric table 200. By this arrangement, the driven mechanism 100 can be prevented from idling or wearing at the terminal point and the starting point of the travelling path during the rising or lowering. Thus, the safety in use of the electric table 200 can be increased. The gear motor is not limited to the present embodiment, and may be used to adjust the height or inclination angle of electric sickbeds or treadmills. The driven mechanism 100 is driven by the gear motor to assist the rising or lowering of the electric table 200. Thus, the driven mechanism 100 may be embodied as a rotating rod or a telescopic rod based on practical demands, and it is not limited to the above embodiment.

Further, since the gear motor is additionally mounted with the driven mechanism 100, various kinds of driven mechanism 100 can be mounted on the gear motor of the present invention. In this way, the manufacturers in this field can reduce their stocks and the difficulty in managing inventory. Further, the cost of assembling the gear motor and the driven mechanism 100 is also reduced.

In prior art, the touch switch has to be positioned to correspond to the travelling path of the driven mechanism, so that the driven mechanism has a large volume due to its long travelling path. In comparison with prior art, the touch switch 4 is positioned to correspond the displacement of the nut 33 (i.e., correspond to the length of the lead screw rod 32). Thus, even though the number of rotations of the lead screw rod 32 is increased, it is not necessary to increase the length of the lead screw rod 32, but only to reduce the pitch of the outer threads of the lead screw rod 32. Therefore, the assembled volume of the gear motor and the driven mechanism 100 is reduced greatly.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A gear motor having a safety mechanism, including:
   a motor body;
   a speed reduction mechanism comprising a worm extending from the motor body and a worm wheel positioned to correspond to the worm and drivingly engaged therewith;
   a transmission mechanism comprising a base fixed to the speed reduction mechanism, a lead screw rod pivotally connected to the base and rotatably driven by the worm wheel, and a nut threadedly connected to the lead screw rod to generate a linear movement; and
   a touch switch electrically connected to the motor body, the touch switch being provided on one side of the lead screw rod to correspond to a travelling path of the nut, thereby stopping the running of the motor body when the nut contacts the touch switch;
   wherein the base is provided with a guiding groove in parallel to the lead screw rod, and the nut has a rotation-stopping portion slidably inserted into the guiding groove, and the rotation-stopping portion is exposed to the outside of the base through the guiding groove.

2. The gear motor having a safety mechanism according to claim 1, wherein the transmission mechanism further includes a fixing element fixed to the base, and the touch switch is provided on the fixing element.

3. The gear motor having a safety mechanism according to claim 2, wherein the fixing element has an adjustable screw rod in parallel to the lead screw rod, the base is provided with an engaging trough in parallel to the adjustable screw rod, the touch switch has a seat portion, the seat portion is provided with an engaging block, a through-hole, and inner threads formed inside the through-hole, the seat portion is threadedly connected to the adjustable screw rod via the inner threads, and the engaging block is slidably inserted into the engaging trough.

4. The gear motor having a safety mechanism according to claim 3, wherein the number of the touch switch and the adjustable screw rod is plural, each of the touch switches is threadedly connected to the corresponding adjustable screw rod, and a gap is formed between any two of the touch switches.

5. The gear motor having a safety mechanism according to claim 3, wherein the engaging block is exposed to the outside of the base through the engaging trough.

6. The gear motor having a safety mechanism according to claim 1, wherein the lead screw rod is arranged to be perpendicular to an axis of the worm.

7. The gear motor having a safety mechanism according to claim 1, wherein the lead screw rod is arranged to be in parallel to an axis of the worm.

8. The gear motor having a safety mechanism according to claim 1, wherein the speed reduction mechanism further comprises a casing, the casing covering the worm and the worm wheel to be fixedly connected to the base.

9. A gear motor having a safety mechanism, including:
   a motor body;
   a speed reduction mechanism comprising a worm extending from the motor body and a worm wheel positioned to correspond to the worm and drivingly engaged therewith;
   a transmission mechanism comprising a base fixed to the speed reduction mechanism, a lead screw rod pivotally connected to the base and rotatably driven by the worm wheel, and a nut threadedly connected to the lead screw rod to generate a linear movement; and
   a touch switch electrically connected to the motor body, the touch switch being provided on one side of the lead screw rod to correspond to a travelling path of the nut, thereby stopping the running of the motor body when the nut contacts the touch switch,
   wherein the transmission mechanism further includes a fixing element fixed to the base, and the touch switch is provided on the fixing element, and the fixing element has an adjustable screw rod in parallel to the lead screw rod, the base is provided with an engaging trough in parallel to the adjustable screw rod, the touch switch has a seat portion, the seat portion is provided with an engaging block, a through-hole, and inner threads formed inside the through-hole, the seat portion is threadedly connected to the adjustable screw rod via the inner threads, and the engaging block is slidably inserted into the engaging trough.

10. The gear motor having a safety mechanism according to claim 9, wherein the number of the touch switch and the adjustable screw rod is plural, each of the touch switches is threadedly connected to the corresponding adjustable screw rod, and a gap is formed between any two of the touch switches.

11. The gear motor having a safety mechanism according to claim 9, wherein the engaging block is exposed to the outside of the base through the engaging trough.

\* \* \* \* \*